(12) United States Patent
Coushaine et al.

(10) Patent No.: US 7,110,656 B2
(45) Date of Patent: Sep. 19, 2006

(54) LED BULB

(75) Inventors: Charles M. Coushaine, Rindge, NH (US); Thomas Tessnow, Weare, NH (US)

(73) Assignee: Osram Sylvania Inc., Danvers, MA (US)

( * ) Notice: Subject to any disclaimer, the term of this patent is extended or adjusted under 35 U.S.C. 154(b) by 7 days.

(21) Appl. No.: 11/058,304

(22) Filed: Feb. 16, 2005

(65) Prior Publication Data

US 2006/0181864 A1 Aug. 17, 2006

Related U.S. Application Data

(60) Provisional application No. 60/639,250, filed on Dec. 27, 2004.

(51) Int. Cl.
G02B 6/00 (2006.01)

(52) U.S. Cl. .......................... 385/147; 385/88; 385/146

(58) Field of Classification Search .................. None
See application file for complete search history.

(56) References Cited

U.S. PATENT DOCUMENTS

2003/0147254 A1* 8/2003 Yoneda et al. ............. 362/551

* cited by examiner

Primary Examiner—Sung Pak
(74) Attorney, Agent, or Firm—William E. Meyer

(57) ABSTRACT

An LED light source has a housing having a base. A hollow core projects from the base and is arrayed about a longitudinal axis. A printed circuit board is positioned in the base at one end of the hollow core and has a plurality of LEDs operatively fixed thereto about the center thereof. In a preferred embodiment of the invention the hollow core is tubular and the printed circuit board is circular. A light guide with a body that, in a preferred embodiment, is cup-shaped as shown in FIGS. 2 and 4a, has a given wall thickness "T". The light guide is positioned in the hollow core and has a first end in operative relation with the plurality of LEDs and a second end projecting beyond the hollow core. The thickness "T" is at least large enough to encompass the emitting area of the LEDs that are employed with it.

9 Claims, 4 Drawing Sheets

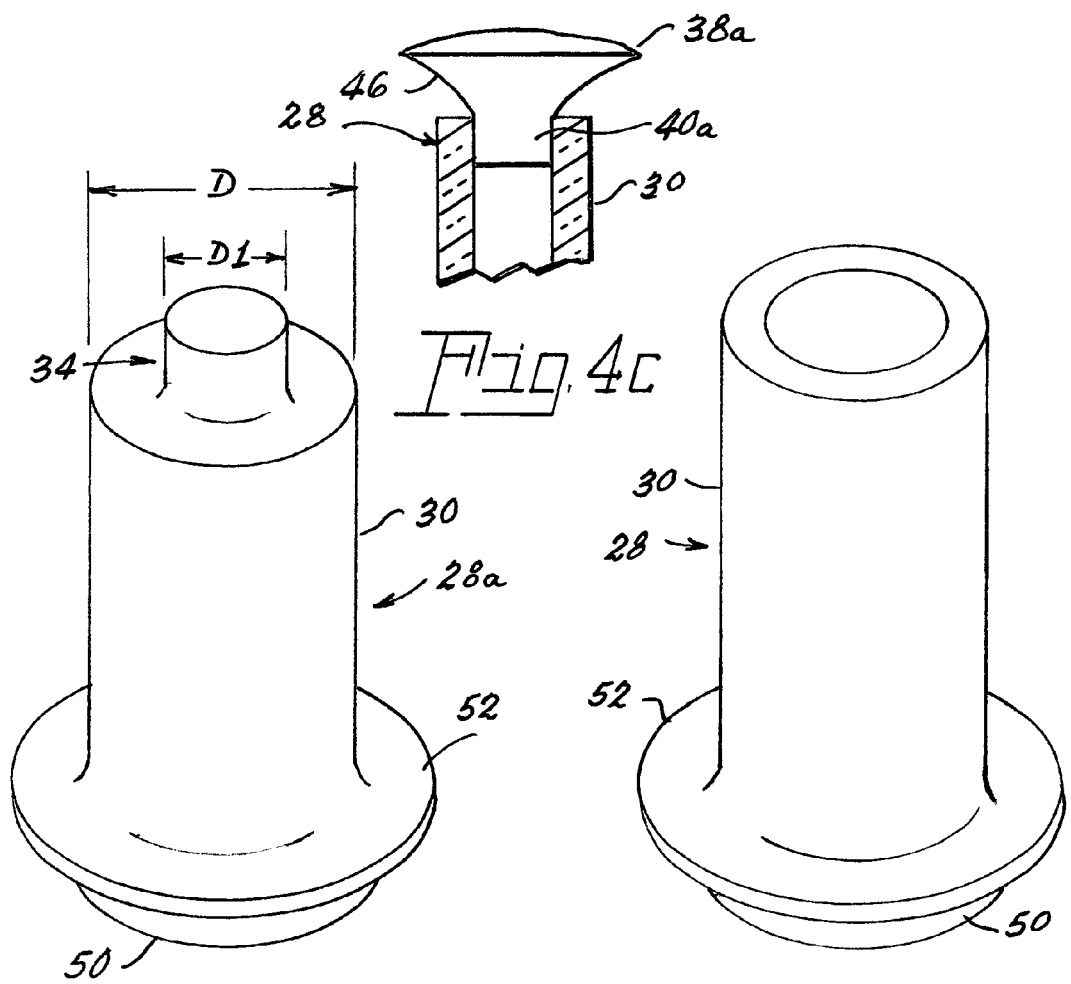

LED BULB

CROSS-REFERENCE TO RELATED APPLICATIONS

This application claims priority from Provisional Patent Application Ser. No. 60/639,250, filed Dec. 27, 2004.

TECHNICAL FIELD

This invention relates to light source and more particularly to light sources employing light emitting diodes (LED or LEDs) and more particularly to light sources useful in the automotive field such as for headlights, taillights, stoplights, fog lights, turn signals, etc. Still more particularly, it relates to such light sources packaged to achieve industry accepted interchangeability.

BACKGROUND ART

In the past, most automotive light sources have involved the use of incandescent bulbs. While working well and being inexpensive, these bulbs have a relatively short life and, of course, the thin filament employed was always subject to breakage due to vibration.

Recently some of the uses, particularly the stoplight, have been replaced by LEDs. These solid-state light sources have incredible life times, in the area of 100,000 hours, and are not as subject to vibration failures. However, these LED sources have been hard-wired into their appropriate location, which increases the cost of installation. It would therefore be an advance in the art if an LED light source could be provided that had the ease of installation of the incandescent light sources. It would be a still further advance in the art if an LED light source could be provided that achieved an industry accepted interchangeable standard to replace the aforementioned incandescent bulb.

Such light sources have been developed and occasionally they have employed LEDs in combination with optical fibers or other light guides to concentrate the light of multiple LEDs or to spread the light in a desired fashion. One such light source is described in co-pending patent application Ser. No. 10/899,546, filed Dec. 20, 2004, and assigned to the assignee of the present invention. The latter light source uses a plurality of light guides, in a one-to-one relationship with a like plurality of LEDs. While the arrangement works well, it is expensive and requires a large number of parts, all of which require rather precise alignment.

It would be a further advance in the art if a light source could be developed using LEDs together with a simplified form of light guide.

DISCLOSURE OF INVENTION

It is, therefore, an object of the invention to obviate the disadvantages of the prior art.

It is another object of the invention to enhance the operation of light sources.

It is yet another object of the invention to provide a simple and yet expedient light guide system for use with light sources.

These objects are accomplished, in one aspect of the invention, by the provision of an LED light source comprising: a housing having a base; a hollow core projecting from said base, said hollow core being arrayed about a longitudinal axis; a printed circuit board positioned in said base at one end of said hollow core and having a plurality of LEDs operatively fixed thereto about the periphery thereof; a light guide with a body having a given wall thickness positioned in said hollow core and having a first end in operative relation with said plurality of LEDs and a second end projecting beyond said hollow core; a heat sink positioned in a heat-transferring relationship with said printed circuit board; and a first reflector attached to said second end of said light guide. The use of a single light guide reduces the number of parts and concomitantly reduces assembly costs. In a preferred embodiment of the invention the hollow core and the light guide are circular, thus reducing alignment concerns.

BRIEF DESCRIPTION OF THE DRAWINGS

FIG. 4a is a perspective view of an embodiment of a light guide employable with the invention;

FIG. 4b is a perspective view of an alternate embodiment of a light guide employable with the invention; and FIG. 4c is a partial section view of a first reflector for use with the embodiment of FIG. 4b.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
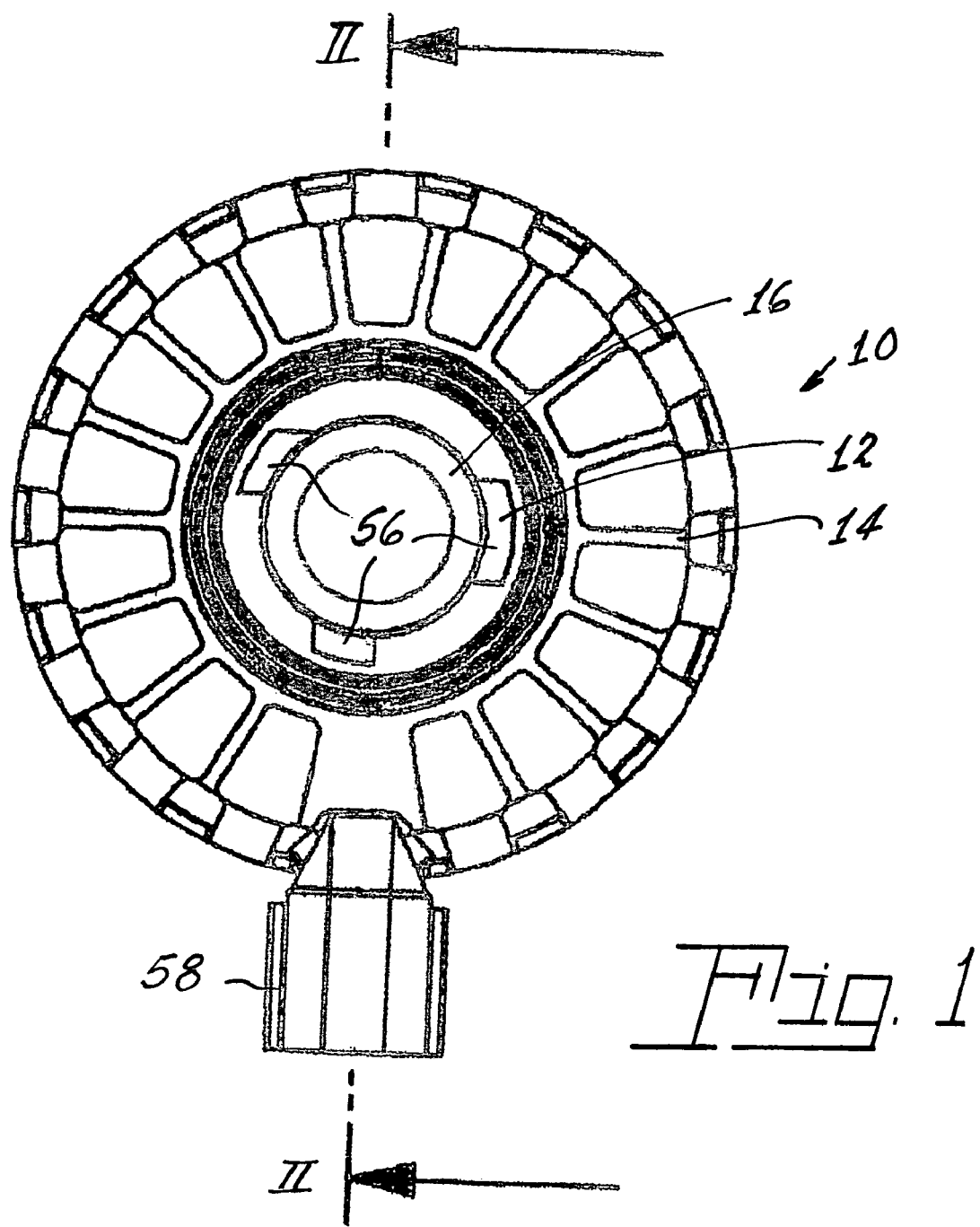
FIG. 1 is a plan view of an embodiment of the invention.
Figure 2:
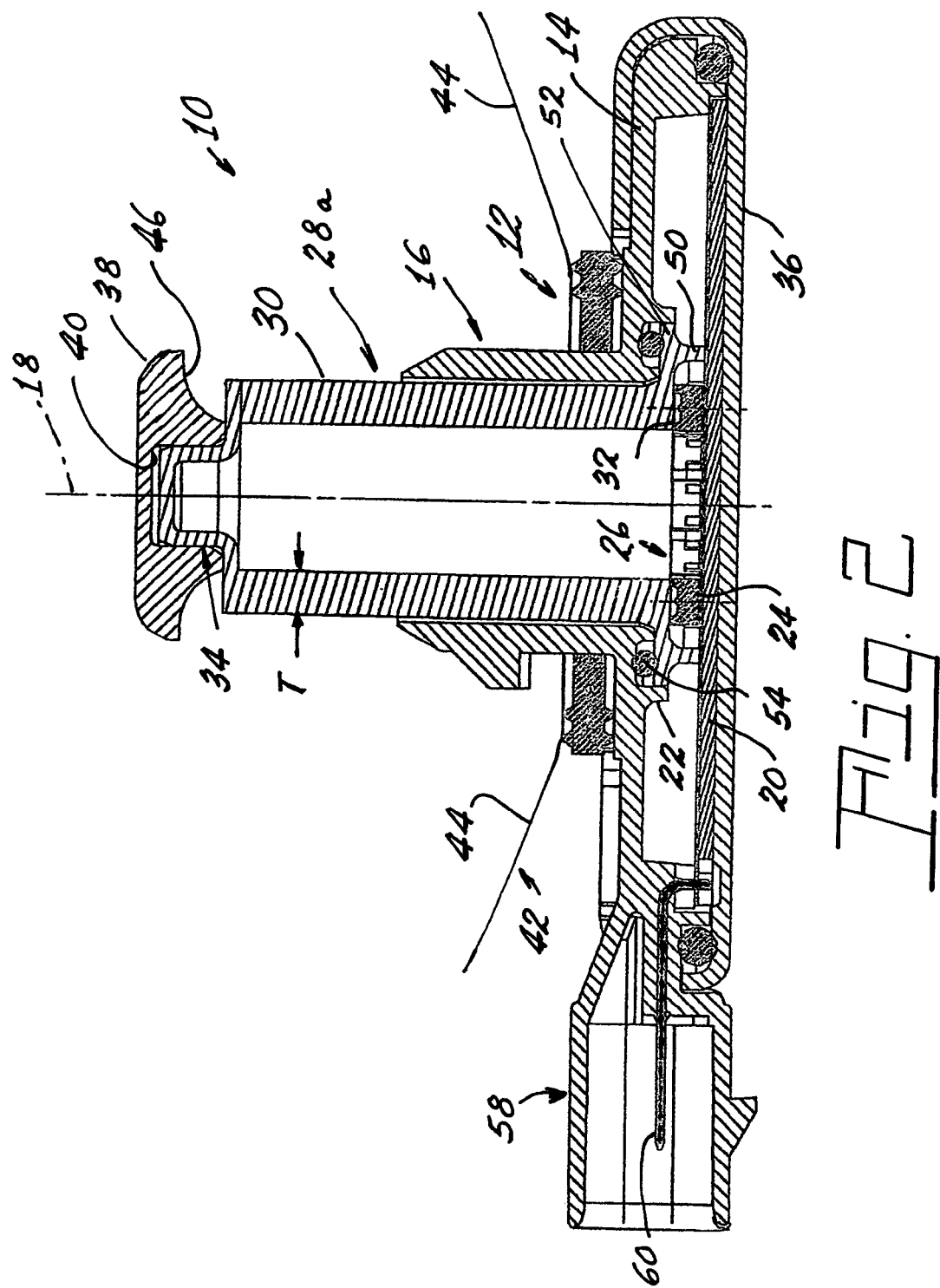
FIG. 2 is a sectional view taken along the line 2—2 of FIG. 1.
Figure 3:
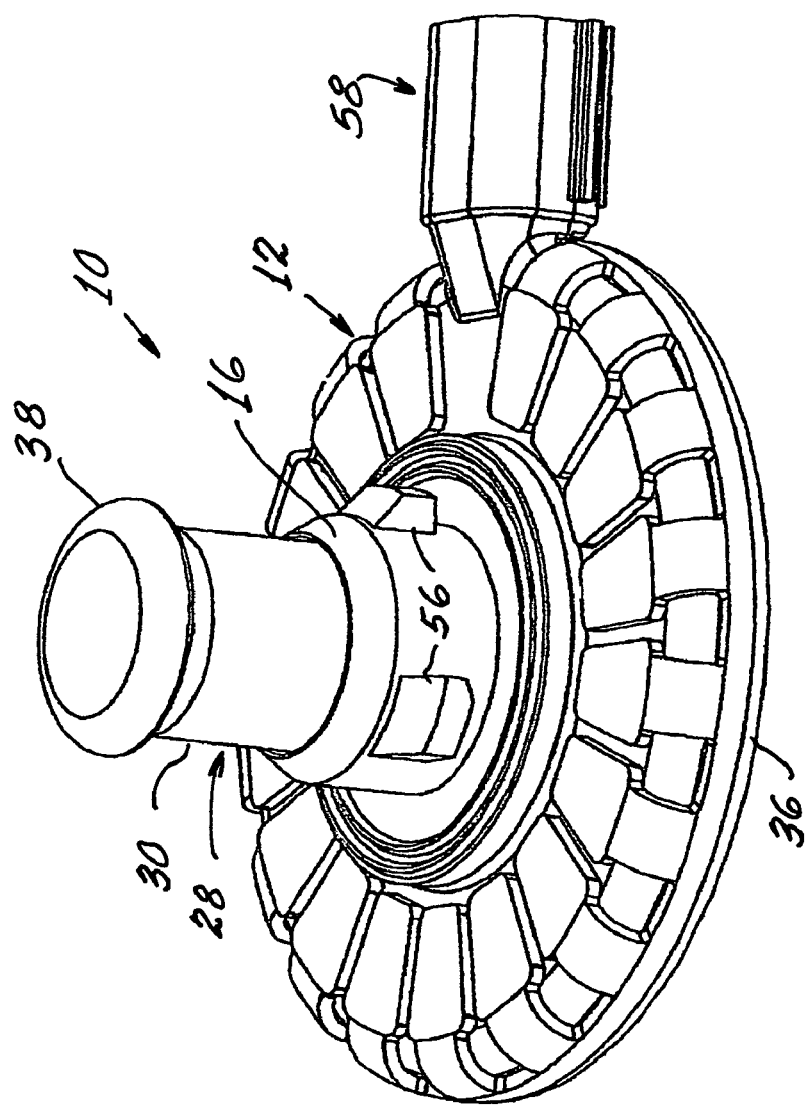
FIG. 3 is a perspective view of an embodiment of the invention, rotated 180 degrees.

Referring now to the drawings with greater particularity, there is shown in FIGS. 1 and 2 an LED light source 10 comprising a housing 12 having a base 14. A hollow core 16 projects from the base 14 and is arrayed about a longitudinal axis 18. A printed circuit board 20 is positioned in the base 14 at one end 22 of the hollow core 16 and has a plurality of LEDs 24 operatively fixed thereto about the center thereof. In a preferred embodiment of the invention the hollow core 16 is tubular and the array of LEDs is circular. A light guide 28 with a body 30 that is, in a preferred embodiment, cup-shaped as shown in FIGS. 2 and 4a, has a given wall thickness "T". The light guide 28 is positioned in the hollow core 16 and has a first end 32 in operative relation with the plurality of LEDs 24 and a second end 34 projecting beyond the hollow core. The thickness "T" is at least large enough to encompass the emitting area of the LEDs that are employed with it. Preferably, first end 32 is located close to and optically formed to capture a substantial portion, if not all, of the emitted light from the LEDs 24 for conduction to the light guide 28.

A heat sink 36 is positioned in a heat-transferring relationship with the printed circuit board 20 and a first reflector 38 is attached to the second end 34 of the light guide 28. A suitable heat sink is shown in co-pending U.S. patent application Ser. No. 10/838,090, filed May 3, 2004 and assigned to the assignee of the present invention, the teachings of which are hereby incorporated by reference.

The preferred light guide 28 has a projecting second end 34 formed with an outside diameter D1 that is less that the outside diameter D of the body 30 and the first reflector 38 is provided with a depression 40 that encompasses the diameter D1 so as to be mateable with the second end 34 of the light guide 28 in a press-fit In an alternate embodiment of the invention a light guide 28a can be tubular and a first reflector 38a can be formed with a protrusion 40a that fits mateably within the open end of the guide 28a.

The light source 10 is formed to fit within an existing aperture in a second reflector 42 and the second reflector 42 has its reflective surface 44 facing a reflective surface 46 on the first reflector 38 or 38a.

The LEDs 24 preferably are arranged in a loop to disperse them one from the other and thereby facilitate cooling. At the same time the light guide 28 is formed as a tube with an optical axis. The tube has an input window at a first end that bridges the LEDs and thereby captures the light emitted directly and from the sides of the LEDs in one light guide.

Preferably, the light guides 28, 28a have a peripheral seat 50 formed at the first end 32 to insure the proper spacing relationship to the LEDs 24. Additionally, the first end 32 can have a flange 52 formed thereabout that can provide a receptive area for a gasket 54 between the flange 52 and the one end 22 of the hollow core 16.

The outer surface of the hollow core 16 can be provided with fastening ears 56 for engaging the light source 10 within the second reflector 42, as is known. Also, a connector 58 can be provided on the body 16 containing electrical contacts 60 for providing the necessary power from an outside source to the printed circuit board 20 and thence to the LEDs 24.

As shown in the drawings, in operation, light from the LEDs 24 is fed through the common light guide 28 or 28a to the first reflector 38 or 38a. The light is reflected from reflective surface 46 back to reflective surface 44 of the second reflector 42 and thence forward to the area to be illuminated. The reflective surfaces 44 and 46 can be optically tuned to determine a preferred output beam pattern. Each can be an interchangeable part specific to a particular beam pattern, while the remaining lamp parts are standard components.

However, if desired the reflective cap 38 or 38a can be eliminated and the light can be emitted directly out of the bulb. The bulb can then be employed with lenses or other structures to customize the light output.

The use of the single, formed light guide drastically reduces the number of parts required and greatly simplifies assembly. In the preferred embodiment, the hollow core 16 and the light guide 28 or 28a are cylindrical, eliminating and alignment steps.

Further, the light guides can be made from molded acrylic materials such as Albis Opitx CA-41 or CA-75.

The utilization of the single light guide facilitates construction and the optical alignment. There are no multiple guides to be individually aligned and supported.

While there have been shown and described what are present considered to be the preferred embodiments of the invention, it will be apparent to those skilled in the art that various changes and modifications can be made herein without departing from the scope of the invention as defined by the appended claims.

What is claimed is:

1. An LED light source comprising:
a housing having a base;
a hollow core projecting from said base, said hollow core being arrayed about a longitudinal axis;
a printed circuit board positioned in said base at one end of said hollow core and having a plurality of LEDs operatively fixed thereto about the center thereof;
a light guide formed as a hollow tube having a given wall thickness, said light guide being positioned in said hollow core and having a first end with an input window located close to and formed to bridge said plurality of LEDs and a second end projecting beyond said hollow core;
a heat sink positioned in a heat-transferring relationship with said printed circuit board; and
a first reflector attached to said second end of said light guide.

2. An LED light source comprising:
a housing having a base;
a hollow core projecting from said base, said hollow core being arrayed about a longitudinal axis;
a printed circuit board positioned in said base at one end of said hollow core and having a plurality of LEDs operatively fixed thereto about the center thereof;
a light guide with a body having a given wall thickness positioned in said hollow core and having a first end in operative relationship with said plurality of LEDs and a second end projecting beyond said hollow core;
a heat sink positioned in a heat-transferring relationship with said printed circuit board; and
a first reflector attached to said second end of said light guide, and
wherein said light guide is cup-shaped and said second end has a diameter less than the diameter of said body.

3. The LED light source of claim 2 wherein said first reflector has a central depression that encompasses diameter of said second end.

4. An LED light source comprising:
a housing having a base;
a hollow core projecting from said base, said hollow core being arrayed about a longitudinal axis;
a printed circuit board positioned in said base at one end of said hollow core and having a plurality of LEDs operatively fixed thereto about the center thereof;
a light guide with a body having a given wall thickness positioned in said hollow core and having a first end in operative relationship with said plurality of LEDs and a second end projecting beyond said hollow core;
a heat sink positioned in a heat-transferring relationship with said printed circuit board; and
a first reflector attached to said second end of said light guide, and
wherein said light guide is tubular, and
wherein said first reflector has a projection that fits inside said tubular light guide.

5. The LED light source of claim 1 wherein a second reflector is positioned about said base having its reflective surface facing the reflective surface of said first reflector.

6. The LED light source in claim 1, wherein the first end of the light guide is optically formed to capture the emitted light from the LEDs.

7. The LED light source in claim 1, wherein the second end of the light guide is formed with a recess to couple with the reflector in a compression fit.

8. The LED light source in claim 1, wherein the second end of the light guide is formed with a protrusion to couple with the reflector in a compression fit.

9. The LED light source in claim 1, wherein the LEDs are arrayed in a circle and the first end of the light guide is similarly sized and shaped to span the array of LEDs.

* * * * *